(12) United States Patent
Pan et al.

(10) Patent No.: US 10,075,216 B2
(45) Date of Patent: Sep. 11, 2018

(54) METHOD FOR AVOIDING DOWNLINK INTERFERENCE BETWEEN INDOOR DAS SYSTEM AND SMALL BASE STATION

(71) Applicant: SUNWAVE COMMUNICATIONS CO., LTD., Hangzhou, Zhejiang Province (CN)

(72) Inventors: Peng Pan, Hangzhou (CN); Xin Chen, Hangzhou (CN); Junrong Yan, Hangzhou (CN); Yingbiao Yao, Hangzhou (CN)

(73) Assignee: SUNWAVE COMMUNICATIONS CO., LTD., Hangzhou (CN)

( * ) Notice: Subject to any disclaimer, the term of this patent is extended or adjusted under 35 U.S.C. 154(b) by 0 days.

(21) Appl. No.: 15/540,858

(22) PCT Filed: Dec. 23, 2015

(86) PCT No.: PCT/CN2015/098457
§ 371 (c)(1),
(2) Date: Jun. 29, 2017

(87) PCT Pub. No.: WO2016/107479
PCT Pub. Date: Jul. 7, 2016

(65) Prior Publication Data
US 2017/0359104 A1    Dec. 14, 2017

(30) Foreign Application Priority Data
Dec. 29, 2014    (CN) .......................... 2014 1 0835621

(51) Int. Cl.
*H04L 12/26*    (2006.01)
*H04B 7/024*    (2017.01)
(Continued)

(52) U.S. Cl.
CPC .......... *H04B 7/024* (2013.01); *H04B 17/318* (2015.01); *H04B 17/336* (2015.01)

(58) Field of Classification Search
None
See application file for complete search history.

(56) References Cited

U.S. PATENT DOCUMENTS 7,715,466 B1 * 5/2010 Oh .................... H04B 7/022
375/140
2011/0269449 A1 * 11/2011 Kazmi ................ H04B 7/024
455/422.1
(Continued)

FOREIGN PATENT DOCUMENTS

CN    101938299 A    1/2011
CN    103391552 A    11/2013
(Continued)

*Primary Examiner* — Otis L Thompson, Jr.
(74) *Attorney, Agent, or Firm* — PROI Intellectual Property US

(57) ABSTRACT

Provided in the present invention is a method for avoiding downlink interference between an indoor DAS system and a small base station, the steps comprising: step 1: determining an initial access RU, and establishing a signal strength table; step 2: the DAS system, by means of the chosen RU, attempts to establish a downlink with UE 1, and detects the signal to interference plus noise ratio (SINR) value of the downlink signal of UE 1, and comparing same with a preset threshold value $\gamma_1$; step 3: UE 1 maintains one or a plurality of RU downlinks assigned thereto by the DAS system, during the communication process continuously detects an SINR value at a set time interval, and on the basis of whether same is greater than $\gamma_1$, ensures a corresponding service quality.

4 Claims, 5 Drawing Sheets

(51) Int. Cl.
*H04B 17/336* (2015.01)
*H04B 17/318* (2015.01)

(56) References Cited

U.S. PATENT DOCUMENTS

| | | | |
|---|---|---|---|
| 2013/0260705 A1* | 10/2013 | Stratford | H04B 17/12 |
| | | | 455/226.1 |
| 2013/0337750 A1* | 12/2013 | Ko | H04W 24/00 |
| | | | 455/67.13 |
| 2013/0344873 A1 | 12/2013 | Sane et al. | |
| 2014/0241185 A1* | 8/2014 | Yanover | H04W 52/146 |
| | | | 370/252 |
| 2014/0269318 A1* | 9/2014 | Hasarchi | H04B 7/024 |
| | | | 370/235 |
| 2014/0334431 A1* | 11/2014 | Zhou | H04W 72/04 |
| | | | 370/329 |
| 2016/0173141 A1* | 6/2016 | Joung | H04W 52/52 |
| | | | 370/242 |
| 2017/0250765 A1* | 8/2017 | Hasarchi | H04B 17/345 |

FOREIGN PATENT DOCUMENTS

| | | |
|---|---|---|
| CN | 103688585 A | 3/2014 |
| CN | 103796216 A | 5/2014 |
| CN | 104579441 A | 4/2015 |

\* cited by examiner

METHOD FOR AVOIDING DOWNLINK INTERFERENCE BETWEEN INDOOR DAS SYSTEM AND SMALL BASE STATION

CROSS REFERENCE TO RELATED APPLICATIONS

The present application is the US national stage of International Patent Application PCT/CN2015/098457 filed on Dec. 23, 2015, which, in turn, claims priority to Chinese Patent Application CN 201410835621.1 filed on Dec. 29, 2014.

TECHNICAL FIELD

The present invention, pertaining to the field of mobile communications, relates to a method for collaboratively suppressing co-channel interference between cells, and in particular, relates to a method for avoiding downlink interference between an indoor distributed antenna system (DAS) and a small base station.

BACKGROUND

With the popularity of smart terminals, demands on wireless data service experiences an explosive increase. As predicted, from 2010 to 2015, global mobile data traffic experiences a 24-fold increase, during 10 years from 2010 to 2020, the traffic will see a 500-fold increase. This is a great challenge for the service providing capabilities of the operators. Generally, mobile services of cellular networks are obviously inhomogeneous. According to statistics, about 60% of voice services and 90% of data services are provided indoors. Therefore, for the operators, providing good indoor coverage is an important means to keep customer retention and improve enterprise benefits. However, according to a survey, about 45% of families and 30% of enterprises confront the problem of poor indoor coverage. This is because the current means of providing indoor coverage are mostly based on outdoor macro-cell base stations. On this context, the concept of small base station is proposed in the industry as an effective means for solving the above problem. The small base stations refer to various low-power, small-coverage and flexibly-deployed wireless access points, and may become a development trend of the future base stations. With such small base stations, indoor coverage, hot spot coverage and deep coverage and the like issues of the mobile communication network may be addressed via mass deployment. This compromises defects of the macro cellular network, improves spectrum efficiency, improves network capacity, better accommodates development needs of the future mobile communication services, and improves user experience.

However, in practical deployment of the small base station, there are still many problems to be solved. Among these problems, interference is prominent. 3GPP LTE proposes the concept of full-frequency multiplexing to further improve spectrum utilization rate, that is, co-frequency networking is employed between different cellular networks. As a result, users at the edge of the cell are subject to severe co-channel interference, and the quality of service (QoS) thereof is degraded. With the deployment of small base stations, in a heterogeneous network constituted by small base stations and traditional macro base stations, the problem of co-channel interference becomes particularly prominent. Especially in indoor deployment of the small base station, mutual interference with the existing indoor coverage system is most likely caused, for example, in a DAS (a simple delay of the traditional macro base station may solve the problem of signal coverage, but system capacity cannot be improved), and thus practical application and deployment of small base stations are restricted.

In 3GPP LTE, an interference coordination mechanism based on collaboration between cells is proposed to reduce co-channel interference between cells, for example, ICIC, eICIC and FeICIC. The basic concept is to enable signals from adjacent cells are orthogonal to each other in the time domain, the frequency domain or the space domain, so as to avoid mutual interference. Nevertheless, implementation of the above interference coordination mechanism consumes some capacity. However, when the small base station and the DAS are in a hybrid deployment, it is hard for the interference coordination mechanism implemented between macro base stations, or indoor macro base stations and small base stations to given a full play. Therefore, a corresponding collaboration mode needs to be designed according to the characteristics such as indoor deployment and distributed deployment of the DAS, and a signal processing method needs to be introduced to suppress the interference.

SUMMARY

To solve the problem that downlink interference is caused between an indoor DAS and a small base station, the present invention, with respect to the feature that the DAS has a plurality of antennas, provides a method for avoiding downlink interference between an indoor DAS and a small base station, and in particular, a method for avoiding downlink co-channel interference applied to the small base station and the indoor DAS, which may effectively reduce mutual interference between the indoor DAS and the small base station.

A technical solution according to the present invention for solving the technical problem is provided. Before description of specific steps of the present invention, some abbreviations and symbols are firstly defined. A main unit of the indoor DAS is represented by MU; a remote unit and an antenna connected thereto are represented by an RU, and $RU_n$ (n being a natural number of 1, 2, 3, . . . ) is defined as the $n^{th}$ RU. The terminal is represented by UE, and particularly, UE 1 represents a terminal accessing the DAS, and UE 2 represents a terminal accessing the small base station. Signal to interference plus noise ratio is represented by SINR, and is a ratio of power of signals to power of interference plus noise. The steps of the present invention involve two SINR thresholds, respectively represented by $\gamma_1$ and $\gamma_2$, wherein $\gamma_1$ is less than $\gamma_2$. If the SINR is less than $\gamma_1$, severe interference is caused and the signal power needs to be increased; and if the SINR is greater than $\gamma_1$, a great power margin is present and the signal power may be properly lowered.

The method for avoiding downlink interference between an indoor DAS and a small base station according toe present invention comprises the following steps:

step 1: determining an initial access RU, and establishing a signal strength table;

wherein when UE 1 needs to access the DAS, an access request is sent to the DAS; the DAS establishes a signal strength table related to UE 1 in an MU according to signal powers at which various RUs receive the request signal; the signal strength table comprises IDs of the RUs and corresponding normalized received signal strengths; the normalized received signal strengths are ratios of practical signal strengths of the RUs to a signal strength of an RU having a strongest received signal, and the RU having the strongest received signal is assigned to UE 1 as an initial access RU of UE 1; and the DAS constantly update the signal strength table during entire communication with UE 1; and wherein the MU is a main unit of the indoor DAS, the RU is a remote unit and an antenna connected to the remote unit; and UE 1 is a terminal accessing the DAS;

step 2: attempting to establish, by the DAS, a downlink with UE 1 via the RU, detecting a signal to interference plus noise ratio (SINR) value of a downlink signal of UE 1, and comparing the SINR value with a predetermined threshold $\gamma_1$ as follows:

(1) if the SINR value is greater than $\gamma_1$, UE 1 performs the following step: establishing a downlink with the RU assigned to UE 1, and starting sending downlink data;

(2) if the SINR value is less than $\gamma_1$, UE 1 performs the following steps:

step 201b: UE 1 feeds back the SINR value to the DAS via the control channel;

step 202b: the DAS select an appropriate number of RUs from candidate RUs according to the SINR value for collaboratively sending data to UE 1;

step 203b: the DAS inquires, via the control channel, a terminal UE 2 accessing the small base station using the same frequency point as UE 1, wherein UE 2 is a terminal accessing the small base station;

step 204b: after confirming that UE 2 uses the same frequency point as UE 1, UE 2 reports this information to the DAS;

step 205b: the DAS subsequently assigns an idle timeslot to UE 2 to instruct UE 2 to send a training sequence;

step 206b: UE 2 sends the training sequence in the assigned timeslot, and the DAS subsequently estimates channels from the selected RUs to UE 2;

step 207: the DAS collaboratively sends precoded data to UE 1 via the selected RUs, such that an SINR value of a received signal of UE 1 is greater than $\gamma_1$ to ensure a corresponding quality of service, and meanwhile, a precoding method is enabled to prevent the signal from causing interference to a received signal of UE 2; and step 3: maintaining, by UE 1, a downlink with one or a plurality of RUs assigned by the DAS, and constantly detecting the SINR value at a specific time interval, and performs the following steps based on whether the SINR value is greater than $\gamma_1$:

(1) if the SINR value is less than $\gamma_1$, operations in step 201b-207b are performed; and (2) if the SINR value is greater than $\gamma_1$, UE 1 continues to compare the SINR value with a predetermined threshold $\gamma_2$, and perform the following steps:

if the SINR value is less than $\gamma_2$, UE 1 continuously maintains communication with the plurality of RUs assigned by the DAS, and constantly detects the SINR value at a specific time interval; and if the SINR value is greater than $\gamma_2$, UE 1 reports the SINR value, and sequentially removes the RUs with reference to signal strengths of the RUs participating collaborative data sending and according to a strength sequence of the received signals, until an SINR value predicted by the DAS is greater than $\gamma_1$ or only one RU remains.

In the present invention, the RUs are selected as follows: if a current SINR value is $\gamma$, excluding an RU with a normalized signal strength of 1 and sequentially selecting the RUs based on a strength sequence of the normalized signal strengths according to the signal strength table, until the following formula is satisfied:

$$\gamma \times \left(1 + \sum_{i=2}^{N} P_i\right) > \gamma_1 \quad (1)$$

wherein $P_i$ indicates a normalized signal strength of an RU ranking the ith in a sequence of the normalized signal strengths in the signal strength table, and parameter N indicates the number of desired RUs satisfying a condition of formula (1).

In the present invention, the precoding method is as follows:

assuming that N RUs participate in collaboratively sending data to UE 1, via channel estimation, channel attenuation coefficients from the N RUs to UE 2 are acquired, respectively represented by $h_{n2}(n=1, \ldots, N)$; $h_2$ indicates a row vector formed of $h_{n2}(n=1, \ldots, N)$, that is, $h_2=[h_{1,2}, h_{2,2}, \ldots h_{N,2}]$; likewise, $h_1=[h_{1,1}, h_{2,1}, \ldots, h_{N,1}]$ which indicates a row vector formed of the channel attenuation coefficients of the N RUs participating in collaborative sending data to UE 1; and a precoding matrix is $w=[w_1, w_2, \ldots, w_N]$, which is a N-lengthed row vector; then the received signal of UE 1 is:

$$y_1 = h_1 w^H x_1 + J + W \quad (2)$$

wherein J indicates interference caused by a downlink signal from the small base station to UE 2, and W indicates noise;

the $n^{th}$ RU participating in collaborating data sending in the DAS has a sending signal n, that is, data sent by the RU is data $w_n x_1$ weighted by $x_1$; and the signal power is increased by adding an RU, to thus improve the SINR value, such that UE 1 is capable of successfully demodulating data, and in this case, the received signal of UE 2 is:

$$y_2 = hx_2 + h_2 w^H x_1 + W \quad (3)$$

wherein scalar h indicates state information of a channel from the small base station to UE 2, and $x_2$ indicates data sent by the small base station to UE 2;

As seen from formula (3), when the number of RUs for collaborative data sending is increased, the interference caused to UE 2 is reinforced. Therefore, the precoding technology needs to be introduced, such that $h_2 w^H = 0$ and the interference caused to UE 2 is eliminated, and meanwhile $h_1 w^H$ does not lower the SINR value of the received signal of UE 1. In practice, the precoding matrix w is a feature vector corresponding to a zero feature value of $h_2^H h_2$. Assuming that v is the feature vector corresponding to the zero feature value of the matrix $h_2^H h_2$, then the precoding matrix is:

$$w = \frac{|h_1|v}{|h_1 v|}$$

wherein calculator |•| indicates that $|y| = \sqrt{yy^H}$, wherein y is a row vector.

In the present invention, the predetermined threshold $\gamma_1$ has a value of −3 dB to 3 dB, and the predetermined threshold $\gamma_2$ has a value of 5 dB to 15 dB.

The present invention achieves the following beneficial effects:

(1) No coordination mechanism needs to be established (sharing information) between the DAS and the small base station, and thus requirements on the feedback link are lowered.

(2) No small base station needs to participate in the operation, and thus family users and SOHO users may freely select different brands small base stations having different functions.

(3) The number of RUs is adaptively determined according to the SINR value, which lowers the complexity in channel estimation and precoding, such that the system performance is stabilized and the parameters of the coding, modulation and the like modules are fixed.

(4) The solution according to the present invention is applicable to small base stations with no X2 interface, and may accommodate the requirement of plug-and-play of the small base stations.

DETAILED DESCRIPTION

The specific embodiments of the present invention are described in detail hereinafter with reference to the accompanying drawings.

Figure 1:
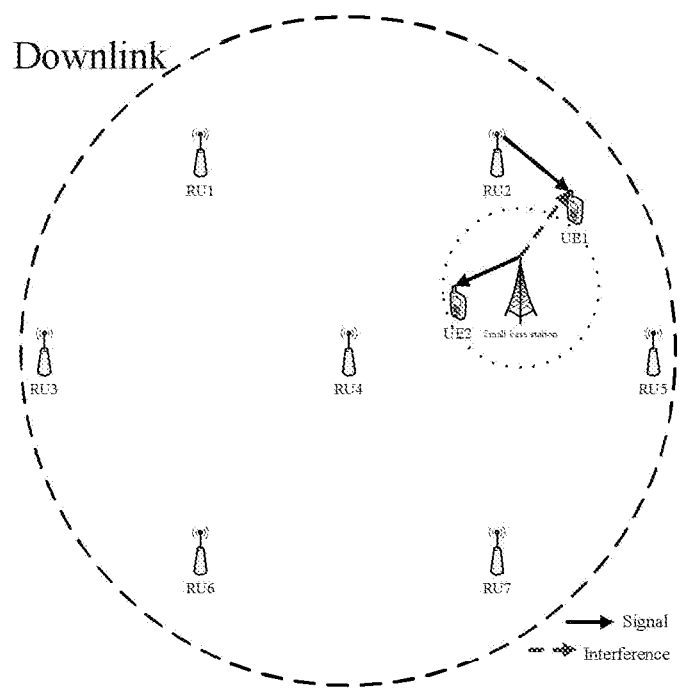
FIG. 1 is a schematic diagram of a scenario of avoiding downlink interference between a DAS and a small base station.

FIG. 1 is a schematic diagram of a scenario of a specific application of the present invention, wherein the scenario involves a DAS and a small base station. In general, the DAS improves indoor signal coverage by means of multiple of RUs distributed in buildings, but cannot enhance network capacity. The small base station is used to cover hot spot regions, which may effectively improve capacity. However, with respect to large buildings, a universal coverage similar to the DAS cannot be implemented. Therefore, in a long period of time, the DAS and the small base station system are hybridly deployed. As such, the universal signal coverage of the buildings is satisfied, and capacity requirements of the hot spot regions are accommodated. The present invention, rightly in this scenario, proposes a solution of avoiding downlink interference between a DAS and a small base station, such that co-frequency deployment is feasible. As illustrated in FIG. 1, UE 1 is a terminal accessing the DAS, and UE 2 is a terminal accessing the small base station. In a case of downlink transmission, downlink transmit signals of the small base station may cause interference to UE 1; and meanwhile, downlink transmit signals of the DAS may also cause interference to UE 2. However, typically, the transmit power of the small base station is 25 dBm, whereas the transmit power of a single RU is only 15 dBm. Therefore, the present invention mainly considers the problem that the small base station causes interference to UE 1; and meanwhile, in the specific implementation process, the multi-antenna feature of the DAS is also fully considered, and the interference caused by the DAS to UE 2 is avoided using the precoding technology.

Figure 2:
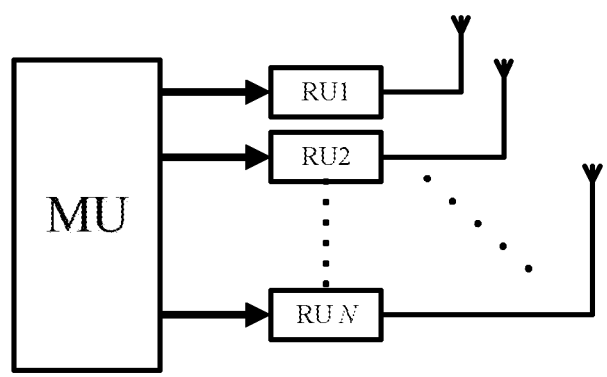
FIG. 2 is a schematic diagram of a DAS according to the present invention.

FIG. 2 is a schematic diagram of an indoor DAS according to the present invention. The indoor DAS mainly comprises an MU and a plurality of RU modules. The functions of the MU related to the present invention are as follows:

1) establishing and maintaining a normalized received signal strength table of UE 1 according to received signal powers fed back by the RUs with respect to UE 1;

2) performing channel estimation according to training sequence signals received by the RUs; and 3) calculating a precoding matrix according to the estimated channel, and assigning weighting coefficients to the RUs.

The functions of the RU related to the present invention are as follows:

1) feeding back powers of received signals to the MU; and 2) weighting the sent data according to the weighting coefficient assigned by the MU.

Figure 3:
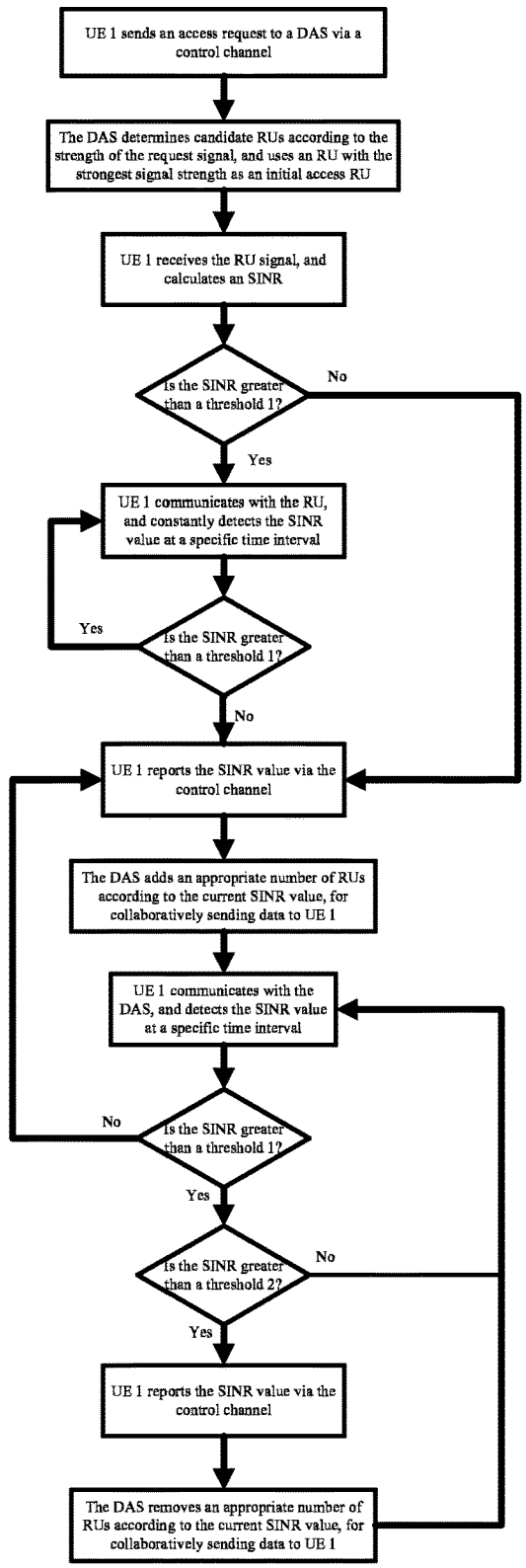
FIG. 3 is a flowchart of avoiding downlink interference between an indoor DAS and a small base station.

FIG. 3 is a normalized received signal strength table established by an MU. The MU establishes a normalized received signal strength table as illustrated in FIG. 3 for each UE accessing the DAS. The Table name corresponding to the table for each UE is an ID of the UE. Each table comprises two fields, respectively an ID of an RU and a normalized received signal power. The normalized received signal power is a ratio of the receive power of the RU to the receive power of an RU with the greatest receive power among all the RUs. Therefore, with respect to the RU with the greatest receive power, the normalized received signal power thereof is 1, and the normalized received signal powers of the other RUs are all less than 1.

Figure 4:
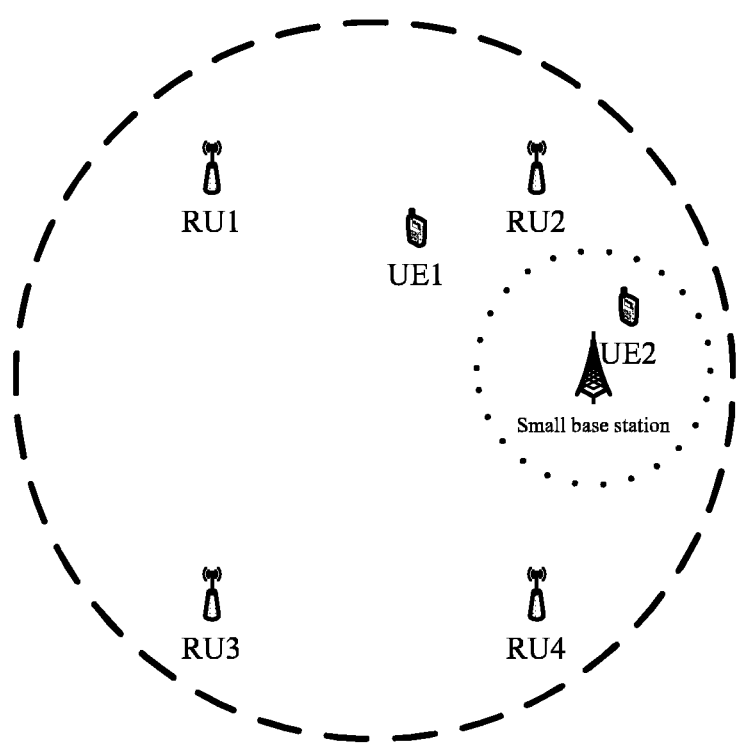
FIG. 4 illustrates a specific embodiment 1 according to the present invention.
Figure 6:
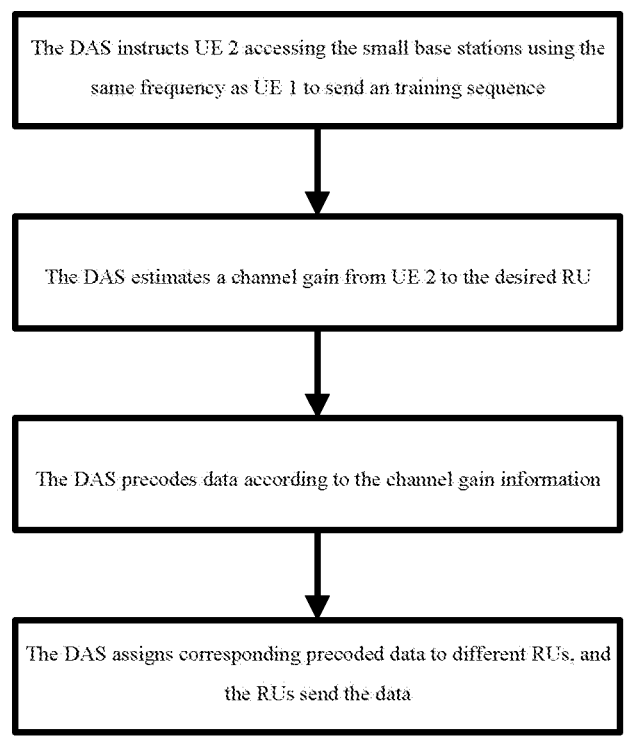
FIG. 6 is a flowchart of collaboratively sending data by a plurality of RUs in a DAS.

FIG. 4 is a flowchart of avoiding downlink interference between an indoor DAS and a small base station. With reference to the scenarios as illustrated in FIG. 4 and FIG. 6, specific embodiments are described for the problem solving flowchart illustrated in FIG. 4.

Figure 5:
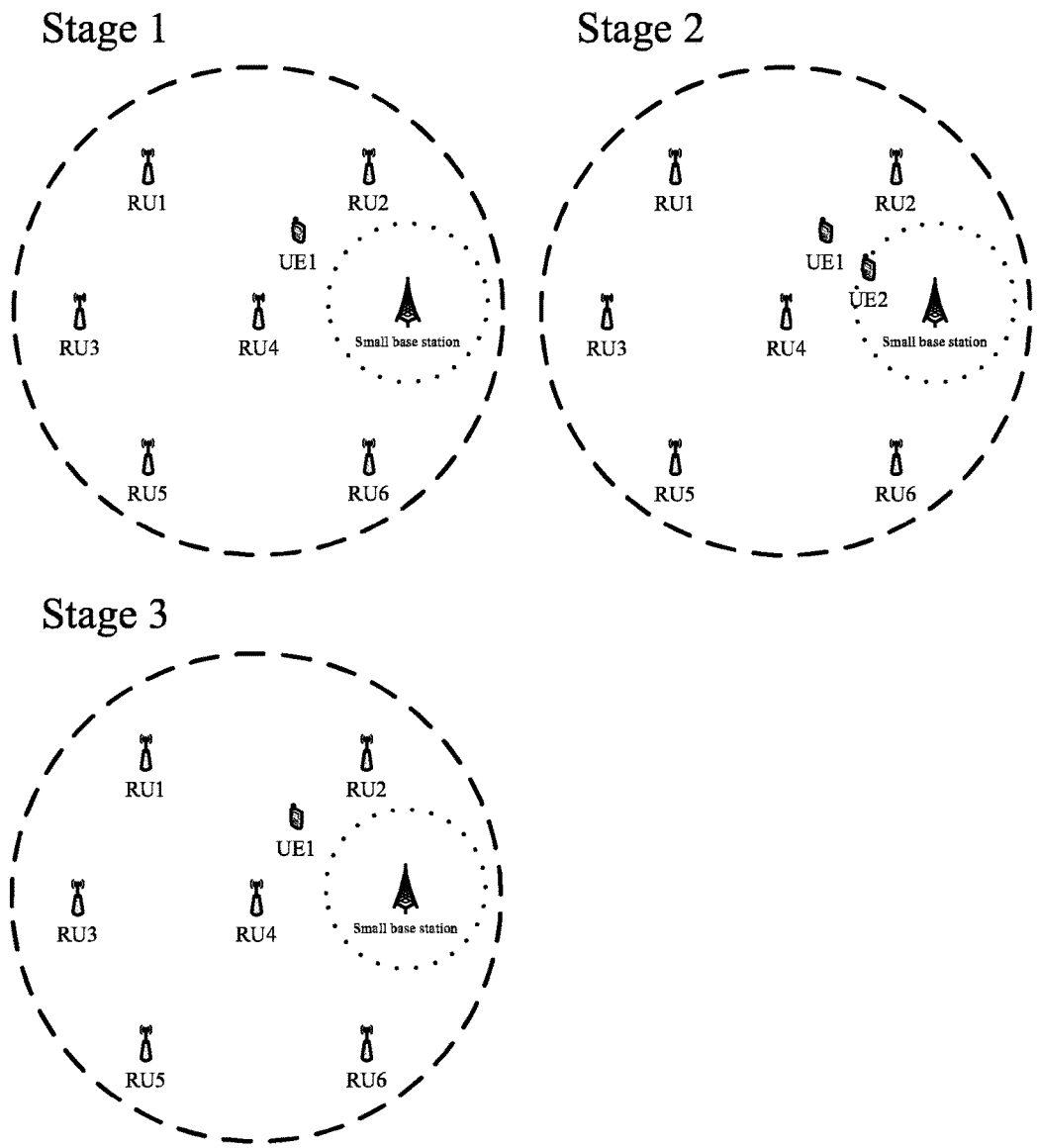
FIG. 5 illustrates a specific embodiment 2 according to the present invention.

In the embodiment illustrated in FIG. 5, the DAS totally has four RUs, and a small base station is deployed in the DAS. The distance from RU 1 to UE 1 is 14 meters, the distance from RU 2 to UE 1 is 10 meters, the distance from RU 3 to UE 1 is 40 meters, the distance from RU 4 to UE 1 is 35 meters, and the distance from the small base station to UE 1 is 17 meters. In this embodiment, assuming that the transmit power of each RU is 15 dBm, and the transmit power of the small base station is 25 dBm, then in this embodiment, $\gamma_1$ has a value of 1 (that is, 0 dB), $\gamma_2$ has a value of 4 (that is, 6 dB), the path loss is inversely proportional to the fourth power of the distance, and the signal-to-noise ratio of the received signal is 10 dB. In the entire communication time period between UE 1 and the DAS, UE 2 also maintains communication with the small base station.

In step 1, UE 1 sends an access request to a DAS via a control channel. Upon receiving the request signal, the RUs in the DAS sends the received signal power to the MU in addition to sending the access request to the MU. The MU establishes a normalized received signal strength table according to the received signal power.

| ID of RU | Normalized received signal strength |
|---|---|
| RU1 | 0.2603 |
| RU2 | 1 |
| RU3 | 0.004 |
| RU4 | 0.007 |

Therefore, the system selects RU 2 as an initial access RU of UE 1.

In step 2, RU 2 attempts to establish a downlink with UE 1, RU 2 sends data to UE 1, and UE 1 calculates an SINR of the received signal to be 0.83 (that is, −8.63 dB) which is less than a predetermined threshold $\gamma_1$. Subsequently, the following steps are performed:

Step 201b: UE 1 feeds back the SINR value to the DAS via the control channel.

Step 202b: The DAS selects, according to the SINR value and based on the normalized received signal strength table, an appropriate number of RUs for collaboratively sending data to UE 1.

In this embodiment, the RUs are sequentially selected according to a sequence of the powers from the normalized received signal strength table. Therefore, RU 1 is firstly selected, and whether the selected RU 1 satisfies formula (1) is determined. In this embodiment, the selected RU 1 satisfies formula (1), that is, 0.83×(1+0.2603)=1.046>1.

Step 203b: The DAS inquires, via a control channel, UE 2 accessing the small base station using the same frequency point as UE 1.

Step 204b: After confirming that UE 2 uses the same frequency point as UE 1, UE 2 reports this information to the DAS.

Step 205b: the DAS subsequently assigns an idle timeslot to UE 2 to instruct UE 2 to send a training sequence;

Step 206b: UE 2 sends the training sequence in the assigned timeslot, and the DAS subsequently estimates channels from the selected RUs to UE 2.

Step 207: The DAS collaboratively sends precoded data to UE 1 via the selected RUs, such that an SINR value of a received signal of UE 1 is greater than $\gamma_1$, and a corresponding quality of service is ensured. Meanwhile, a precoding method is enabled to prevent the signal from causing interference to a received signal of UE 2.

In this embodiment, only RU 1 and RU 2 are involved in collaborative data sending. Therefore, $h_1=[h_{1,1}, h_{2,1}]$ and $h_2=[h_{1,2}, h_{2,2}]$. The matrix $h_2^H h_2$ is a 2×2 matrix, and a non-zero feature value and a zero feature value are present. Assuming that v is a feature vector corresponding to the zero feature value, then $h_2 v^H=0$. To ensure that the power upon precoding is unchanged, the precoding matrix is assumed to $w=|h_1|v/|h_1 v|$ which is a 1×2 vector. Therefore, the received signal of UE 1 is $y_1=h_1 w^H x_1+J+W$, and since an RU is added for collaborative data sending, the SINR is increased from 0.83 in independent data sending to 1.046 in collaborative data sending. In addition, the received signal of UE 2 is $y_2=hx_2+h_2 w^H x_1+W=hx_2+W$, and the DAS may not cause additional interference to the small base station.

In step 3, in this embodiment, in the communication between UE 1 and the DAS, UE 2 constantly maintains communication with the small base station. Therefore, the SINR is constantly 1.046, which satisfying $\gamma_1$ and less than $\gamma_2$, and thus the system only detects the SINR at a specific time interval. This time interval may be defined in the system configuration file according to the actual needs.

In the embodiment illustrated in FIG. 6, considering dense deployment of the RUs, the DAS totally has six RUs, and a small base station is deployed in the DAS. The distance from RU 1 to UE 1 is 6 meters, the distance from RU 2 to UE 1 is 5 meters, the distance from RU 3 to UE 1 is 10 meters, the distance from RU 4 to UE 1 is 6 meters, the distance from RU 5 to UE 1 is 15 meters, the distance from RU 6 to UE 1 is 14 meters, and the distance from the small base station to UE 1 is 9 meters. In this embodiment, assuming that the transmit power of each RU is 15 dBm, and the transmit power of the small base station is 25 dBm, then $\gamma_1$ has a value of 1 (that is, 0 dB), $\gamma_2$ has a value of 2.5 (that is, 6 dB), the path loss is inversely proportional to the fourth power of the distance, and the signal-to-noise ratio of the received signal is 10 dB. In the entire communication time period between UE 1 and the DAS, the communication between UE 2 and the small base station involves three stages. At the first stage, the small base station does not communicate with UE 2; at the second stage, the small base station communicates with UE 2; and at the third stage, the communication between the small base station and UE 1 is complete.

According to step 1, UE 1 sends an access request to a DAS via a control channel. Upon receiving the request signal, the RUs in the DAS sends the received signal power to the MU in addition to sending the access request to the MU. The MU establishes a normalized received signal strength table according to the received signal power.

| ID of RU | Normalized received signal strength |
|---|---|
| RU1 | 0.6339 |
| RU2 | 1 |
| RU3 | 0.1768 |
| RU4 | 0.6339 |
| RU5 | 0.0642 |
| RU6 | 0.0762 |

Therefore, the system selects RU 2 as an initial access RU of UE 1.

In step 2, RU 2 attempts to establish a downlink with UE 1, and RU 2 sends data to UE 1. Since in this case, the small base station causes no downlink interference, the SINR is a signal-to-noise ratio of the system, which is 10 dB and is greater than $\gamma_1$. Then step 201a is performed.

In step 3, UE 1 maintains a downlink with RU 2 assigned by the DAS, and constantly detects the SINR value in the communication at a specific time interval.

In this embodiment, if UE 2 does not access the small base station, the SINR remains unchanged, the system does not perform any operation, and UE 1 only constantly detects the SINR value based on a predetermined time interval. Once UE 2 accesses the small base station, as illustrated at stage 2 in FIG. 6, UE 1 may detect changes of the SINR within an SINR detection period. According to assumptions of the parameters in this embodiment, the SINR in this case is lowered to about 0.43 (that is, −3.7 dB). In this case, the SINR is less than $\gamma_1$, and thus the system performs steps 201b-207b.

Step 201b: UE 1 feeds back the SINR=0.43 to the DAS via the control channel.

Step 202b: The DAS selects, according to the SINR value and based on the normalized received signal strength table, an appropriate number of RUs for collaboratively sending data to UE 1.

In this embodiment, the RUs are sequentially selected according to a sequence of the powers from the normalized received signal strength table. Therefore, RU 1 (or RU 4, random selection) is firstly selected, and whether the selected RU 1 satisfies formula (1) is determined. If the selected RU 1 does not satisfy formula (1), another RU is selected. In this embodiment, RU 1, RU 4 and RU 3 need to be selected to satisfy formula (1), that is, 0.43×(1+0.6339+0.6339+0.1768)=1.051>1.

Step 203b: The DAS inquires, via a control channel, UE 2 accessing the small base station using the same frequency point as UE 1.

Step 204b: After confirming that UE 2 uses the same frequency point as UE 1, UE 2 reports this information to the DAS.

step 205b: the DAS subsequently assigns an idle timeslot to UE 2 to instruct UE 2 to send a training sequence;

Step 206b: UE 2 sends the training sequence in the assigned timeslot, and the DAS subsequently estimates channels from the selected RUs to UE 2.

Step 207: The DAS collaboratively sends precoded data to UE 1 via the selected RUs, such that an SINR value of a received signal of UE 1 is greater than $\gamma_1$, and a corresponding quality of service is ensured. Meanwhile, a precoding method is enabled to prevent the signal from causing interference to a received signal of UE 2.

In this embodiment, only RU 1 and RU 2 are involved in collaborative data sending. Therefore, $h_1=[h_{1,1}, h_{2,1}, h_{3,1}, h_{4,1}]$ and $h_2=[h_{1,2}, h_{2,2}, h_{3,2}, h_{4,2}]$. The matrix $h_2^H h_2$ is a 4×4 matrix, and a non-zero feature value and a zero feature value are present. The feature vector corresponding to a zero feature value is randomly selected, and then $h_2 v^H=0$. To ensure that the power upon precoding is unchanged, the precoding matrix is assumed to $w=|h_1|v/|h_1v|$ which is a 1×4 vector. Therefore, the received signal of UE 1 is $y_1=h_1 w^H x_1+J+W$, and since an RU is added for collaborative data sending, the SINR is increased from 0.43 in independent data sending to 1.051 in collaborative data sending. In addition, the received signal of UE 2 is $y_2=hx_2+h_2 w^H x_1+W=hx_2+W$, and the DAS may not cause additional interference to the small base station.

If the precoding technology is not used and UE 2 is at the edge of a coverage range of the small base station, since the DAS employs multi-RU collaborative data sending, the SINR is lowered. In this embodiment, considering the position relationship between UE 2 and RU 2, between UE 2 and RU 4 and between UE 2 and the small base station (assuming that the distances from UE 2 to RU 2, from UE 2 to RU 4 and from UE 2 to the small base station are all 6 meters), the SINR of UE 2 may be lowered by 3 dB.

After step 207b is performed, step 3 is performed.

In step 3, UE 1 maintains downlinks with RU 1, RU2, RU3 and RU4 RU 2 assigned by the DAS, and constantly detects the SINR value in the communication at a specific time interval. In this embodiment, if UE 2 does not quit the small base station, the SINR remains unchanged, the system does not perform any operation, and UE 1 only constantly detects the SINR value based on a predetermined time interval. If the system enters the third stage as illustrated in FIG. 6, that is, UE 2 quits the communication prior to UE 1, then due to elimination of interference, the SINR is far greater than the signal-to-noise ratio of the system, which is 10 dB in this embodiment, in this case, the following operations are performed.

Firstly according to the normalized signal strength table, the RU with the weakest received signal strength is removed out of collaboratively data sending. In this embodiment, the firstly removed RU is RU 3. Then the SINR is calculated. If the calculated SINR is still greater than $\gamma_2$, which is 4 (6 dB) in this embodiment, the RU with the weakest received signal strength is continuously removed. This removal operation is performed until the SINR is grater than $\gamma_1$ but less than $\gamma_2$, or the SINR is greater than $\gamma_1$ but the system has only one RU which maintains communication with UE 1. In this embodiment, since the signal-to-noise ratio is 10 dB, finally only RU 2 maintains downlink communication with UE 1. Afterwards, the system enters step 3.

In step 3, UE 1 maintains downlink communication with RU 2, and continuously detects the SINR at a specific time interval and performs a corresponding operation according to the detected SINR.

The above embodiments are merely exemplary embodiments of the present invention, but are not intended to limit the protection scope of the present invention. Any modification, equivalent replacement, or improvement made without departing from the spirit and principle of the present invention should fall within the protection scope of the present invention.

What is claimed is:

1. A method for avoiding downlink interference between an indoor Distributed Antenna System (DAS) and a small cell base station, comprising:
   step 1: determining an initial access unit (RU), and establishing a signal strength table;
   wherein when a first terminal (UE1) needs to access the DAS, an accessing request is sent to the DAS; the DAS establishes the signal strength table for the UE1 in a main unit (MU) according to signal powers at which the various RUs receive the accessing request; the signal strength table comprises IDs of the RUs and corresponding normalized received signal strengths; the said normalized received signal strengths are ratios respectively of actual received signal strengths of the RUs to a signal strength of the RU having the strongest received signal strength, and then the RU having the strongest received signal strength is assigned to the UE1 as its initial access unit (RU); and the DAS constantly update the signal strength table during entire communication with the UE1; and
   wherein the MU is a main unit of the indoor DAS, the RU is a remote unit and an antenna connected to the remote unit; and the UE1 is a terminal accessing the DAS;
   step 2: establishing a downlink by the DAS to the UE1 via the RU, detecting a signal to interference plus noise ratio (SINR) value of a downlink signal of the UE1, and comparing the SINR value with a predetermined threshold $\gamma_1$ as follows:
   (1) if the SINR value is greater than $\gamma_1$, the UE1 performs the following steps:
   establishing a downlink to the RU assigned to the UE1, and starting to send a downlink data;
   (2) if the SINR value is less than $\gamma_1$, the UE1 performs the following steps:
   step 201b: the UE1 feeds back the SINR value to the DAS via a control channel;
   step 202b: the DAS selects an appropriate number of the RUs from all available RUs according to the SINR value to collaboratively send data to the UE1;
   step 203b: the DAS inquires, via the control channel, a second terminal UE2 using the same frequency point of the UE1, wherein the UE2 is a terminal accessing the small cell base station;
   step 204b: after confirming that UE2 uses the same frequency point of the UE1, the UE2 will report this information to the DAS;
   step 205b: the DAS subsequently assigns an idle time slot to the UE2 to instruct the UE2 to send a training sequence;
   step 206b: UE 2 sends the training sequence in the assigned time slot, and the DAS subsequently estimates channels from the selected RUs to the UE2;
   step 207: the DAS collaboratively sends precoding data to the UE1 via the selected RUs, so that the SINR value of a signal received by the UE1 is greater than $\gamma_1$, and meanwhile, a precoding method is enabled to prevent the signal from causing interference to a received signal of UE2 through a precoding method signal receiving by the UE2 can be prevented from an interference caused by signal receiving by the UE1; and step 3: the UE1 maintaining the downlink with one or a plurality of RUs assigned by the DAS, and constantly detecting the SINR value at a regular time interval, and performs the following steps based on whether the SINR value is greater than $\gamma_1$:

(1) if the SINR value is less than $\gamma_1$, operations in steps 201*b*-207*b* are performed; and (2) if the SINR value is greater than $\gamma_1$, the UE1 continues to compare the SINR value with a predetermined threshold $\gamma_2$, and performs the following steps:

if the SINR value is less than $\gamma_2$, the UE1 continuously maintains the communication with the plurality of RUs assigned by the DAS, and constantly detects the SINR value at the regular time interval; and if the SINR value is greater than $\gamma_2$, the UE1 reports the SINR value to the DAS, and sequentially removes the RUs according to an order of the received signal strength of the RUs participating the collaborative data sending from strong to weak, until the SINR value predicted by the DAS is greater than $\gamma_1$ or only one of the RUs remains.

2. The method for avoiding downlink interference between an indoor DAS and a small cell base station according to claim 1, wherein the RUs are selected as follows: if a current SINR value is $\gamma$, excluding a RU with a normalized signal strength of 1 and sequentially selecting the RUs with an order of the normalized signal strength from strong to weak according to the signal strength table, until the following formula is satisfied:

$$\gamma \times \left(1 + \sum_{i=2}^{N} P_i\right) > \gamma_1 \qquad (1)$$

wherein $P_i$ indicates a normalized signal strength of an RU ranked $i^{th}$ in a sequence of the normalized signal strengths from strong to weak in the signal strength table, and parameter N indicates the number of the RUs satisfied the condition of the formula (1).

3. The method for avoiding downlink interference between an indoor DAS and a small base station according to claim 1, wherein the precoding method is as follows:

assuming that N of the RUs participate in the collaboratively data sending to the UE1, via a channel estimation, acquiring channel attenuation coefficients from the N of the RUs to the UE2 which are respectively represented by $h_{n2}$ (n=1, . . . , N); $h_2$ indicates a row vector formed of $h_{n2}$ (n=1, . . . N), that is, h2=$[h_{1,2}, h_{2,2}, \ldots, h_{N,2}]$; likewise, $h_1=[h_{1,1}, h_{2,1}, \ldots, h_{n,1}]$ which indicates a row vector formed of the channel attenuation coefficients of the N of the RUs participating in collaborative data sending to the UE1; and a precoding matrix is w=$[w_1, w_2, \ldots, w_N]$, which is a N-lengthed row vector; then the received signal of the UE1 is:

$$y_1 = h_1 w^H x_1 + J + W \qquad (2)$$

wherein J indicates an interference caused by a downlink signal from the small cell base station to the UE2, and W indicates a noise;

the $n^{th}$ of the RUs participating in collaborating data sending in the DAS has a sending signal $w_n x_1$, that is, data sent by the RU is a data $x_1$ weighted by $w^n$; and the signal power is increased by adding an RU to thus improve the SINR value, so that the UE1 is capable of successfully demodulating data, and in this case, the received signal of the UE2 is:

$$y_2 = hx_2 + h_2 w^H x_1 + W \qquad (3)$$

wherein the scalar h indicates a state information of a channel from the small cell base station to the UE2, and $x_2$ indicates data sent by the small cell base station to the UE2;

the precoding matrix w is an eigen-vector corresponding to a zero-eigenvalue of the matrix $h_2^H h_2$, and assuming that v is an eigenvector corresponding to the zero-eigenvalue of $h_2^H h_2$, then the precoding matrix is:

$$w = \frac{|h_1|v}{|h_1 v|}$$

Wherein the calculator |•| indicates that $|y|=\sqrt{yy^H}$, wherein y is a row vector.

4. The method for avoiding downlink interference between an indoor DAS and a small cell base station according to claim 1, wherein the predetermined threshold $\gamma_1$ has a value of −3 dB to 3 dB, and the predetermined threshold $\gamma_2$ has a value of 5 dB to 15 dB.

* * * * *